C. E. YATES.
PRESSURE REGULATING VALVE.
APPLICATION FILED FEB. 26, 1917.
1,273,304.
Patented July 23, 1918.
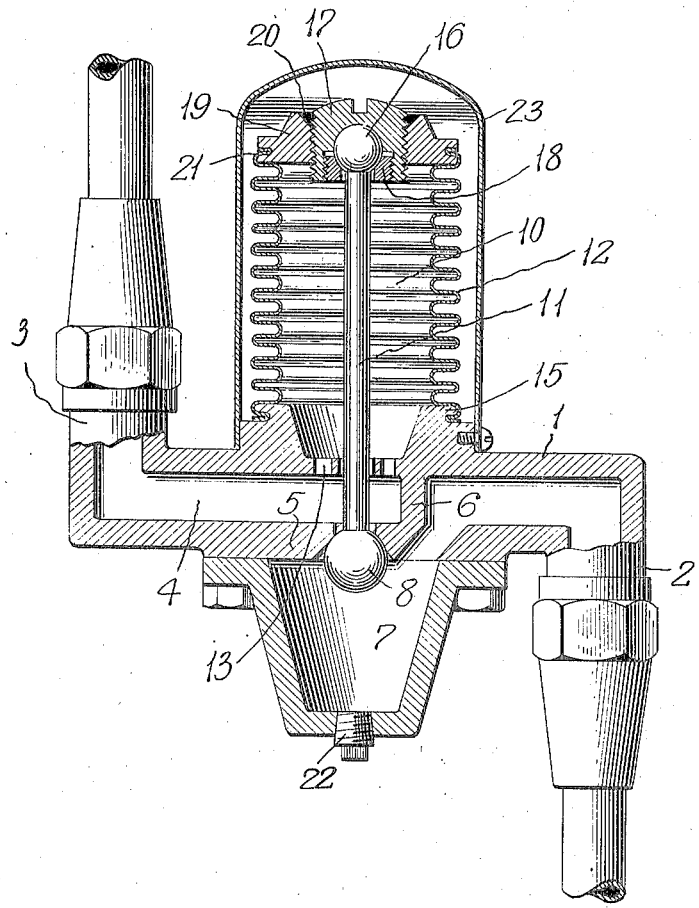

UNITED STATES PATENT OFFICE.

CHARLES E. YATES, OF DETROIT, MICHIGAN, ASSIGNOR, BY MESNE ASSIGNMENTS, TO KELVINATOR CORPORATION, OF WILMINGTON, DELAWARE, A CORPORATION OF DELAWARE.

PRESSURE-REGULATING VALVE.

1,273,304.   Specification of Letters Patent.   Patented July 23, 1918.

Application filed February 26, 1917. Serial No. 151,072.

*To all whom it may concern:*

Be it known that I, CHARLES E. YATES, a citizen of the United States of America, residing at Detroit, in the county of Wayne and State of Michigan, have invented certain new and useful Improvements in Pressure-Regulating Valves, of which the following is a specification, reference being had therein to the accompanying drawings.

This invention relates to a pressure regulating valve and an arrangement thereof whereby it is peculiarly responsive to variations in back pressures and whereby the valve, when once adjusted, maintains itself in operative condition, there being no packing to deteriorate under use.

The invention consists in the matters hereinafter set forth, and more particularly pointed out in the appended claims.

The drawing is a view in vertical section, partially broken away and in elevation, of a valve that embodies features of the invention.

Referring to the drawing, a valve casing 1 is arranged for an inlet connection 2 and an outlet fitting 3 for attachment in any pressure line or the like, whereby fluid may be passed through a duct 4 from the inlet to the outlet.

An annular seat is formed in a suitable opening in the lower wall 5 of the casing whereby fluid passing through the casing, is deflected by a cross wall 6 into a trap basin 7 and thence through this apertured valve seat to the outlet.

Coöperating with the valve seat is a valve member 8 having a stem 11 connected to the outer end of the expansible chamber 10 in such wise that upon the extension of that chamber the opening will be closed. The valve member 8 is here shown as spherical in shape.

Preferably the extensible chamber is formed by a fluted or bellows wall 12 of suitable sheet metal, the lower marginal portion of which is secured hermetically over openings 13 in the casing wall on the outlet side of the valve seat, as by being impressed around a channeled annular flange 15 or the like.

A ball head 16 on the stem is secured in a screw plug 17 by a collar 18 that loosely encircles the stem and permits accurate adjustment between the parts, the spring tension afforded by the wall being thereby regulatable so that the valve will close at a predetermined pressure. When once adjusted, the parts are held in fixed position by solder 20 or the like which prevents accidental rotation of the plug, while being easily melted by a blow-torch when the plug is desired to be removed or adjusted.

As a matter of good mechanical detail, the wall of the chamber has a close lock joint as at 21 with the chamber head 19 and a drain plug 22 is provided for emptying the trap 7. A shield 23 is also preferably secured detachably over the collapsible chamber to afford protection thereto.

As a result of this construction, a valve is obtained that accurately regulates flow therethrough under the action of back pressure on the outlet end of the valve, the adjustment afforded by the construction permitting close calibration. Furthermore, variations in arrangement between the parts caused by unequal movement of the chamber wall, or the like, do not effect the complete sealing of the seat because of the universal joint connection of the stem with the chamber head and the use of the ball closure on the spherical-concave seat. Changes in tension are easily produced at any time by the use of a screw driver and blow torch, while the swivel connection between the stem and screw plug permits the grinding of the stem without changing the adjustment by removing the trap 7 or even by introducing a tool through the plug opening 22.

Obviously, changes in the details of construction may be made without departing from the spirit of my invention and I do not care to limit myself to any particular form or arrangement of parts.

I claim as my invention:—

1. In a device of the character described, in combination, a hollow casing having a valve seat therein, a valve member coöperating with said seat and having a stem, a longitudinally extensible chamber surrounding said stem and communicating with the interior of said casing, said chamber having an aperture in its end farthest from said valve seat, and a hollow connecting member located in said aperture and receiving said stem, said member being connected to one of the adjacent parts by screw threads whereby the tension may be adjusted and to the other of the parts by a swivel joint to permit rotation of the valve without changing the tension.

2. In a device of the character described, in combination, a hollow casing having a valve seat therein, a circumferentially corrugated longitudinally-expansible, cylindrical sheet metal casing secured to said casing in alinement with the axis of said seat and communicating with the interior of the casing, and a rigid stem adjustably secured to the outer end of said chamber and formed with an enlargement constituting a closure for said seat.

3. In a device of the character described, in combination, a hollow casing having a valve seat therein, a circumferentially-corrugated longitudinally-expansible, cylindrical sheet metal casing secured to said casing in alinement with the axis of said seat and communicating with the interior of the casing, the outer end wall of said chamber having a circular aperture, a valve coöperating with said seat and having a stem extending into said chamber, and a connecting member rotatably mounted in said aperture and rotatably connected to said stem.

4. In a device of the character described, in combination, a hollow casing having a valve seat therein, a circumferentially-corrugated longitudinally-expansible, cylindrical sheet-metal casing secured to said casing in alinement with the axis of said seat and communicating with the interior of the casing, the outer end wall of said chamber having a circular aperture, a connecting member located in said aperture and adapted to be rotated therein, and a valve coöperating with said seat and having its stem operatively connected to said member, the joint between said member and the chamber wall being sealed with a fusible metal.

5. A pressure regulating valve comprising a casing having a duct therethrough and a valve seat between the ends thereof, an annular flange on the casing concentric with the valve seat, a chamber having a collapsible corrugated wall secured at one end to the flange and provided at its opposite end with a head, a valve coöperating with said seat and having a rigid stem projecting into said chamber, and connecting means including screw threads and a swivel between the end of the stem and the chamber head whereby the valve can be either ground or adjusted.

6. A pressure regulating valve comprising a casing having a duct therethrough with an annular valve seat between the ends thereof, a collapsible chamber having a fluted wall extensible axially, sealed at the lower end to the casing and provided with a head at the upper end, the chamber being in communication with the duct on the outlet side of the seat, a valve member coöperating with the under side of the seat, a stem extending upwardly in the chamber, an adjustable screw cap in the head having ball-and-socket connections with the stem and means for sealing the cap in adjusted position.

In testimony whereof I affix my signature in the presence of two witnesses.

CHARLES E. YATES.

Witnesses:
C. R. STICKNEY,
A. M. DORR.